(12) United States Patent
Robertson, Jr. et al.

(10) Patent No.: US 12,311,891 B2
(45) Date of Patent: May 27, 2025

(54) VEHICLE ASSEMBLY WITH SENSOR CLEANING

(71) Applicant: Ford Global Technologies, LLC, Dearborn, MI (US)

(72) Inventors: Michael Robertson, Jr., Garden City, MI (US); Venkatesh Krishnan, Canton, MI (US); Mohan Kamath, West Bloomfield, MI (US); John A. Shinska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 365 days.

(21) Appl. No.: 18/065,678

(22) Filed: Dec. 14, 2022

(65) Prior Publication Data

US 2024/0198969 A1 Jun. 20, 2024

(51) Int. Cl.
| | |
|---|---|
| *B60S 1/46* | (2006.01) |
| *B60R 11/04* | (2006.01) |
| *B60S 1/58* | (2006.01) |
| *H04N 23/52* | (2023.01) |

(52) U.S. Cl.
CPC . *B60S 1/46* (2013.01); *B60S 1/58* (2013.01); *H04N 23/52* (2023.01); *B60R 11/04* (2013.01)

(58) Field of Classification Search
None
See application file for complete search history.

(56) References Cited

U.S. PATENT DOCUMENTS

| | | |
|---|---|---|
| 8,671,504 B2 | 3/2014 | Ono et al. |
| 10,682,987 B2 | 6/2020 | Trebouet et al. |
| 2009/0250533 A1 | 10/2009 | Akiyama et al. |

FOREIGN PATENT DOCUMENTS

| | | |
|---|---|---|
| EP | 3169549 B1 | 3/2019 |

*Primary Examiner* — Rita P Adhlakha
(74) *Attorney, Agent, or Firm* — Frank A. MacKenzie; Brooks Kushman P.C.

(57) ABSTRACT

A vehicle assembly includes a vehicle window, a sprayer positioned above the vehicle window and aimed at the vehicle window, a sensor positioned below the vehicle window, and a deflector positioned to receive fluid from the sprayer and shaped to direct the fluid to the sensor. A single sprayer therefore provides cleaning for both the vehicle window and the sensor.

20 Claims, 6 Drawing Sheets

VEHICLE ASSEMBLY WITH SENSOR CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

A vehicle assembly includes a vehicle window, a sprayer positioned above the vehicle window and aimed at the vehicle window, a sensor positioned below the vehicle window, and a deflector positioned to receive fluid from the sprayer and shaped to direct the fluid to the sensor.

In an example, the vehicle assembly may further include a body panel, the vehicle window may be mounted to the body panel, the sensor may be mounted to the body panel, and the deflector may be mounted to the body panel. In a further example, the sprayer may be mounted to the body panel.

In another further example, the body panel may be a liftgate, and the vehicle window may be a rear windshield.

In another further example, the deflector may include an inlet positioned to receive the fluid from the sprayer and a gutter positioned between the inlet and the body panel. In a yet further example, the gutter may be positioned to divert fluid flowing on the body panel from entering the inlet.

In an example, the deflector may be positioned to receive the fluid passing through ambient air from the sprayer to the deflector.

In an example, the deflector may include an inlet positioned to receive the fluid from the sprayer, an outlet positioned to direct the fluid onto the sensor, and a channel leading from the inlet to the outlet. In a further example, the channel may have a width oriented parallel to the vehicle window and perpendicular to a direction of flow through the channel, and the width of the channel may be smaller at the outlet than at the inlet. In a yet further example, the width of the channel may decrease continuously from an end of the channel closer to the inlet to an end of the channel closer to the outlet.

In another further example, the deflector may include a cover enclosing the channel from the inlet to the outlet. In a yet further example, the channel and the cover may form a tunnel, and a cross-sectional area of the tunnel may be smaller at the outlet than at the inlet. In a still yet further example, the cross-sectional area of the tunnel may decrease continuously from an end of the tunnel closer to the inlet to an end of the tunnel closer to the outlet.

In another yet further example, the cover may be facing at least partially upward. In a still yet further example, the inlet may be facing at least partially upwards, and the cover may extend directly above an entirety of the inlet.

In another yet further example, the cover may include an exterior side facing away from the channel, and the deflector may include a gutter positioned to divert fluid flowing on the exterior side of the cover from flowing over the sensor.

In an example, the sprayer may be shaped to eject the fluid in a spray pattern, and the spray pattern may include a flat-fan pattern directed onto the vehicle window. In a further example, the spray pattern may include a stream directed past the vehicle window to the deflector.

In an example, the deflector may be positioned vertically between the vehicle window and the sensor.

In an example, the sensor may be a camera including a lens, and the deflector may be shaped to direct the fluid onto the lens.

With reference to the Figures, wherein like numerals indicate like parts throughout the several views, a vehicle assembly 105 of a vehicle 100 includes a vehicle window 110, a sprayer 115 positioned above the vehicle window 110 and aimed at the vehicle window 110, a sensor 120 positioned below the vehicle window 110, and a deflector 125 positioned to receive fluid from the sprayer 115 and shaped to direct the fluid to the sensor 120.

The vehicle assembly 105 provides cleaning for both the vehicle window 110 and the sensor 120. The fluid ejected by the sprayer 115 can remove dust and debris from the vehicle window 110 and the sensor 120. An occupant of the vehicle 100 may thus have a clearer view through the vehicle window 110. The sensor 120 may thus have an increased accuracy of data generated by the sensor 120. The vehicle assembly 105 can provide the cleaning with fewer components than having separate sprayers for both the vehicle window 110 and the sensor 120, e.g., fewer hoses, junctions, etc. Using the deflector 125 can accommodate the positions of the sprayer 115 above the vehicle window 110 and the sensor 120 below the window, e.g., when the vehicle window 110 is a rear windshield and the sensor 120 is a backup camera.

Figure 1:
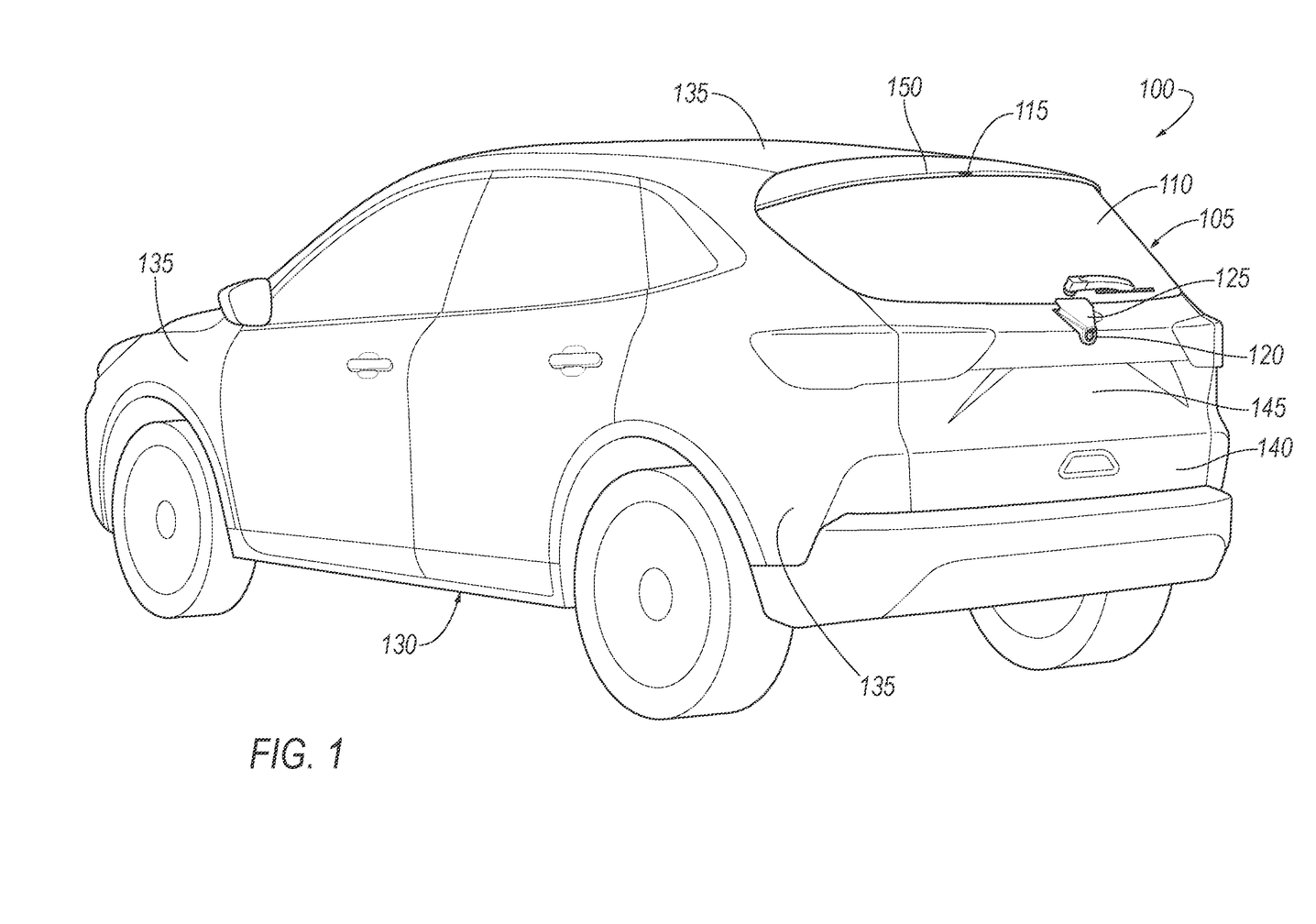
FIG. 1 is a rear perspective view of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 130. The vehicle 100 may be of a unibody construction, in which a frame and the body 130 of the vehicle 100 are a single component. The vehicle 100 may, alternatively, be of a body-on-frame construction, in which the frame supports the body 130 that is a separate component from the frame. The frame and body 130 may be formed of any suitable material, for example, steel, aluminum, etc.

The body 130 includes body panels 135 partially defining an exterior of the vehicle 100. The body panels 135 may present a class-A surface, e.g., a finished surface exposed to view by a customer and free of unaesthetic blemishes and defects. The body panels 135 include, e.g., a liftgate 140, etc.

The vehicle 100 can include the liftgate 140, e.g., a rear liftgate, that supports the vehicle window 110 and the sensor 120. The liftgate 140 can be hingedly coupled to the rest of the body 130, e.g., at a rear edge of a roof of the vehicle 100. The liftgate 140 can be rotatable relative to the body 130 between a closed position as shown in FIG. 1 and an open position permitting access to a rear storage area of the vehicle 100 (not shown).

The vehicle 100 includes the vehicle window 110. The vehicle window 110 is positioned to permit an occupant of the vehicle 100 to view outside the vehicle 100. The vehicle window 110 can be a rear windshield, i.e., facing rearward relative to a forward direction of travel of the vehicle 100. A rear windshield is typically positioned in a low-pressure zone when the vehicle 100 is traveling forward, meaning that dust is more likely to settle on the vehicle window 110. The fluid provided to the vehicle window 110 as described below is thus more beneficial when the vehicle window 110 is a rear windshield. The vehicle window 110 can be mounted to and supported by one of the body panels 135, e.g., the liftgate 140. For example, the vehicle window 110 may be fixed relative to the liftgate 140 and bordered by the liftgate 140. The liftgate 140 can extend fully around the edges of the vehicle window 110. The vehicle window 110 can be positioned in a top half of the liftgate 140. The vehicle window 110 may be formed of any suitably durable transparent material, including glass such as laminated, tempered glass or plastic such as Plexiglas® or polycarbonate.

The sensor 120 may detect the external world, e.g., objects and/or characteristics of surroundings of the vehicle 100, such as other vehicles, road lane markings, traffic lights and/or signs, pedestrians, etc. For example, the sensor 120 may be a radar sensor, ultrasonic sensor, scanning laser range finder, light detection and ranging (lidar) device, or image processing sensor such as a camera. As a camera, the sensor 120 can detect electromagnetic radiation in some range of wavelengths. For example, the sensor 120 may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type. For another example, the sensor 120 may be a time-of-flight (TOF) camera, which includes a modulated light source for illuminating the environment and detects both reflected light from the modulated light source and ambient light to sense reflectivity amplitudes and distances to the scene. The camera includes a lens 205 defining the field of view of the camera (as shown in FIG. 2B).

The sensor 120 is positioned below the vehicle window 110. For example, the sensor 120 may be mounted to the body panel 135, e.g., the liftgate 140, below the vehicle window 110. The sensor 120 may be laterally centered on the liftgate 140, i.e., positioned on a centerline of the vehicle 100. The sensor 120 may be positioned vertically between the vehicle window 110 and a license-plate recess 145 of the liftgate 140. The position of the sensor 120 permits the sensor 120 to be used as, e.g., a backup camera.

The vehicle 100 can include a center high-mounted stop lamp (CHMSL) 150 positioned above the vehicle window 110. The CHMSL 150 can include a lamp and a cover extending over the lamp that is transparent and tinted red. The lamp of the CHMSL 150 can be illuminated in response to braking of the vehicle 100.

The sprayer 115 is positioned above the vehicle window 110. For example, the sprayer 115 may be mounted to the body panel 135, e.g., the liftgate 140, above the vehicle window 110. The sprayer 115 may be laterally centered on the liftgate 140, i.e., positioned on a centerline of the vehicle 100. The sprayer 115 may be attached to the liftgate 140 at a top of the liftgate 140. For example, the sprayer 115 may be mounted to the CHMSL 150.

The deflector 125 is positioned vertically between the vehicle window 110 and the sensor 120, e.g., below the vehicle window 110 and above the sensor 120. For example, the deflector 125 may be mounted to the body panel 135, e.g., the liftgate 140, below the vehicle window 110 and above the sensor 120. The deflector 125 may be fully below the vehicle window 110, i.e., a highest point of the deflector 125 is below a lowest point of the vehicle window 110. The deflector 125 may be partially above the sensor 120, e.g., a lowest point of the deflector 125 is below a highest point of the sensor 120, and a center of gravity of the deflector 125 is above the highest point of the sensor 120. The position of the deflector 125 permits redirection of the fluid emitted as described below.

Figure 2A:
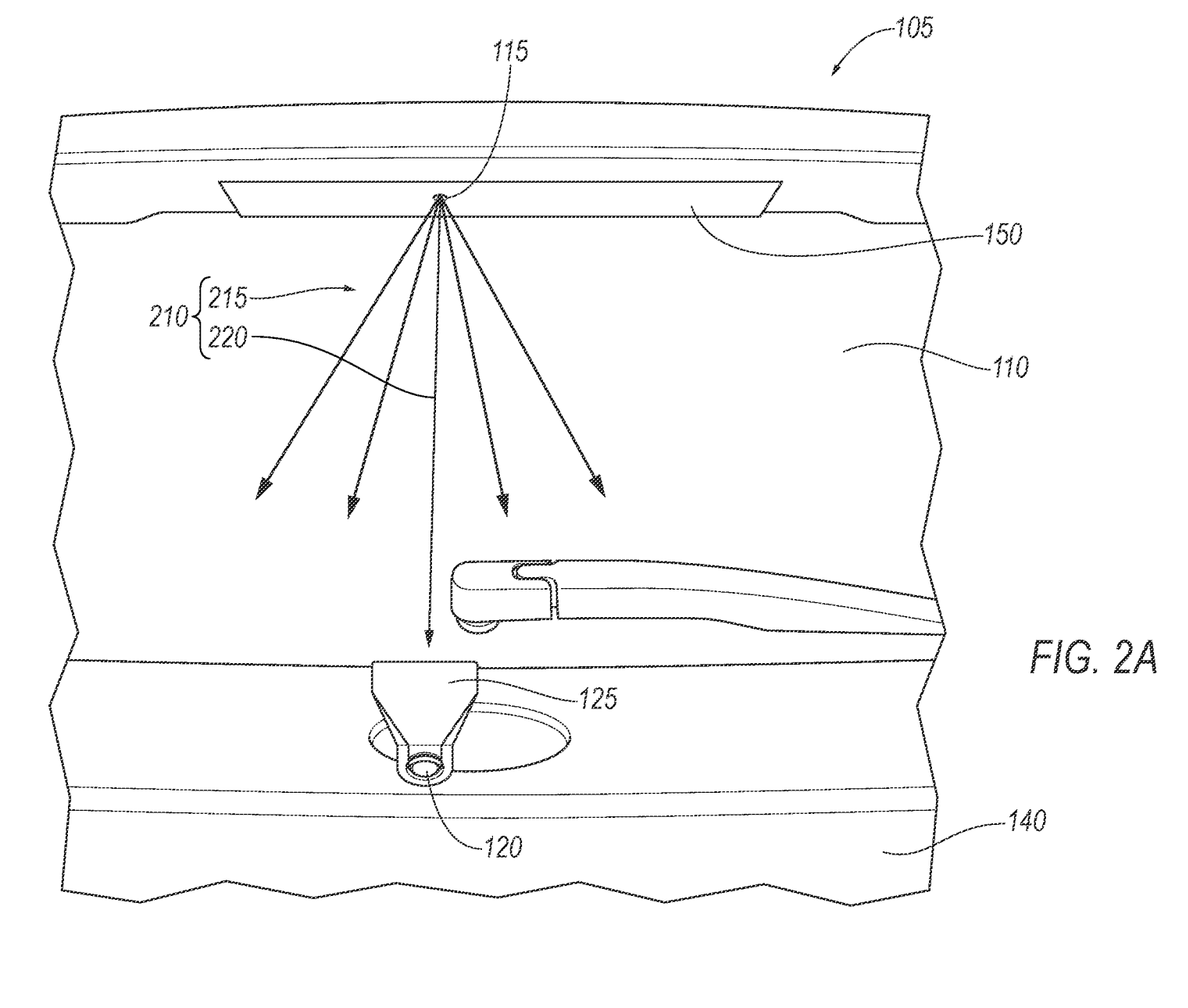
FIG. 2A is a rear plan view of a portion of the vehicle.
Figure 2B:
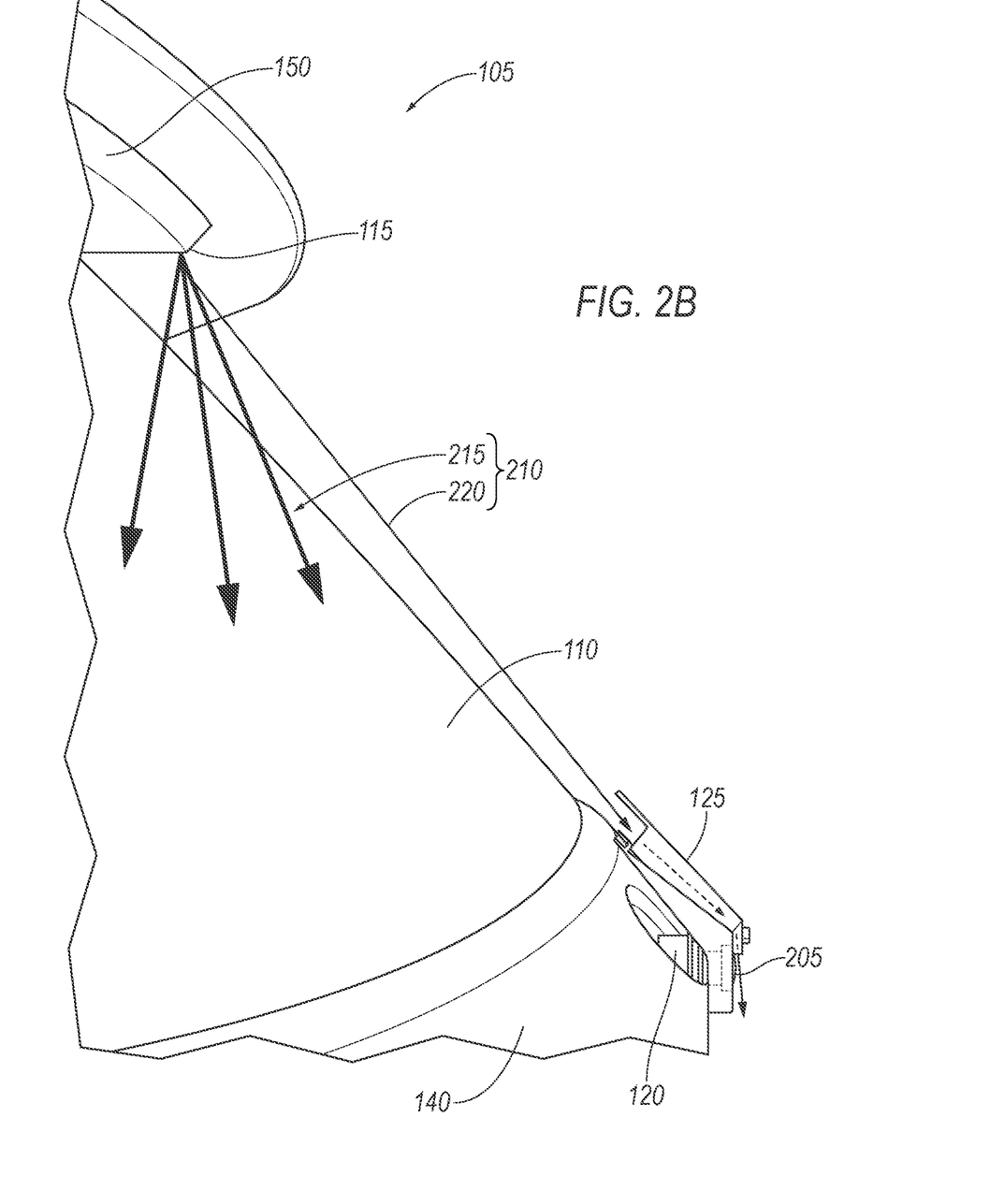
FIG. 2B is a side view of the portion of the vehicle with a deflector.

With reference to FIGS. 2A-B, the sprayer 115 is aimed at the vehicle window 110, i.e., is positioned and shaped to eject fluid directly onto the vehicle window 110. For example, the sprayer 115 may be shaped to eject the fluid in a spray pattern 210, and the spray pattern 210 may include a flat-fan pattern 215 directed onto the vehicle window 110. For the purposes of this disclosure, a "flat-fan pattern" means that the spray of fluid has an increasing width in one dimension as the spray moves away from the sprayer 115 and has a generally flat shape along a plane defined by the width and the direction of discharge. The spray pattern 210 may further include a stream 220 directed past the vehicle window 110 to the deflector 125. The sprayer 115 may be positioned and shaped so that the stream 220 of fluid passes through ambient air from the sprayer 115 to the deflector 125.

The deflector 125 is positioned to receive fluid from the sprayer 115. For example, the deflector 125 may be positioned to receive the fluid passing through the ambient air from the sprayer 115 to the deflector 125, e.g., to intercept the stream 220 of fluid of the spray pattern 210 ejected by the sprayer 115. The deflector 125 is shaped to direct the fluid received from the sprayer 115 to the sensor 120, e.g., onto the lens 205, as described below.

Figure 3:
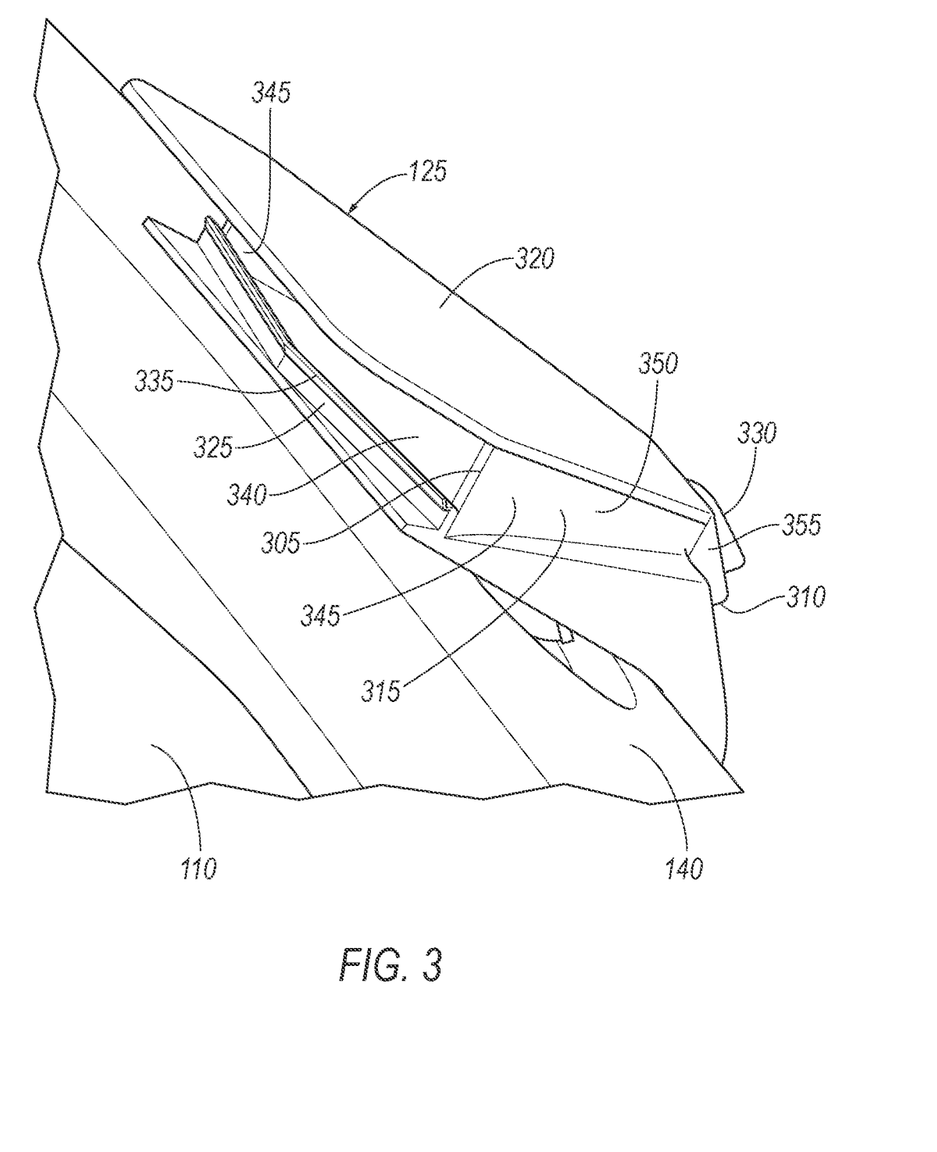
FIG. 3 is a perspective view of the deflector on the portion of the vehicle.
Figure 4:
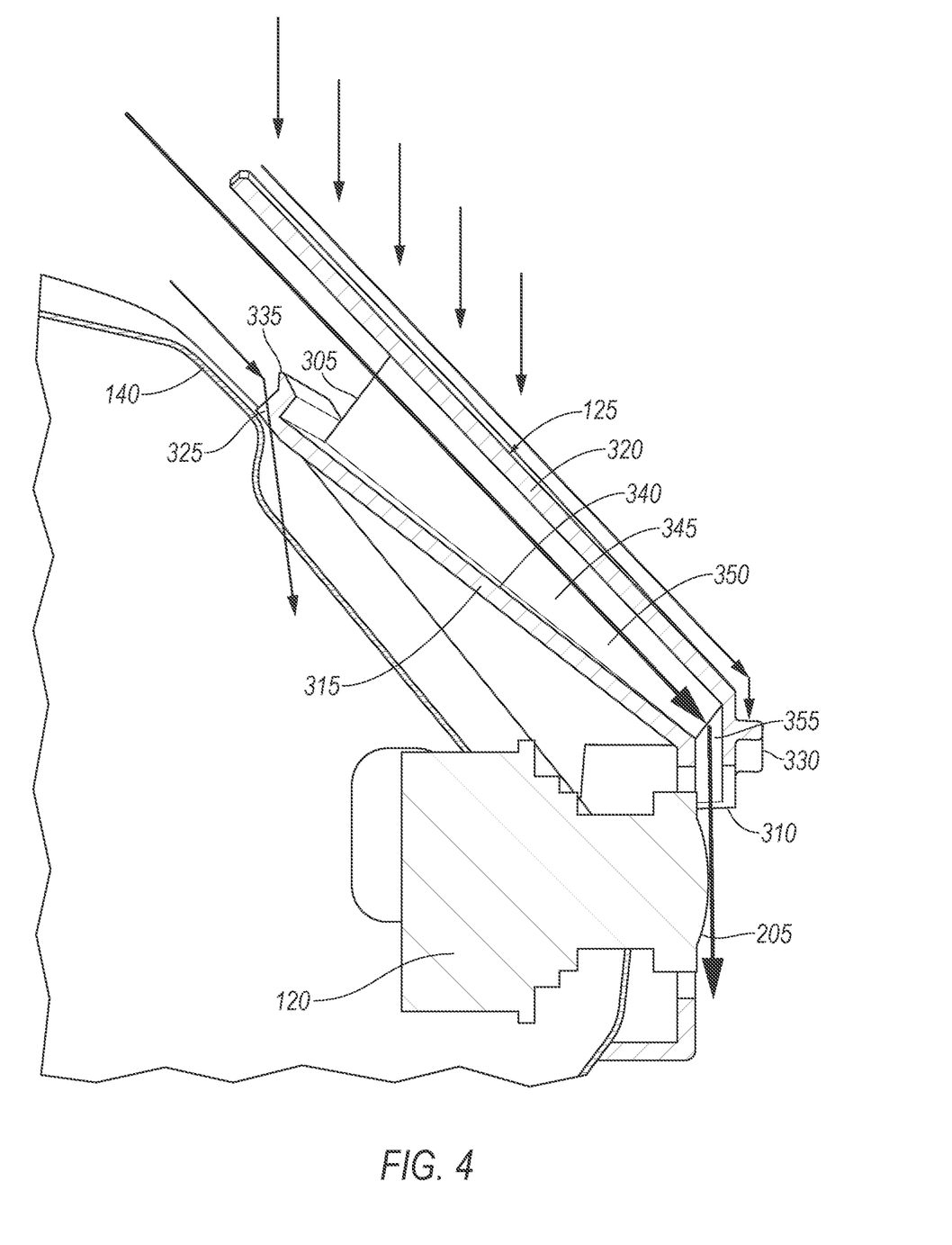
FIG. 4 is a side cross-sectional view of the deflector on the portion of the vehicle.
Figure 5:
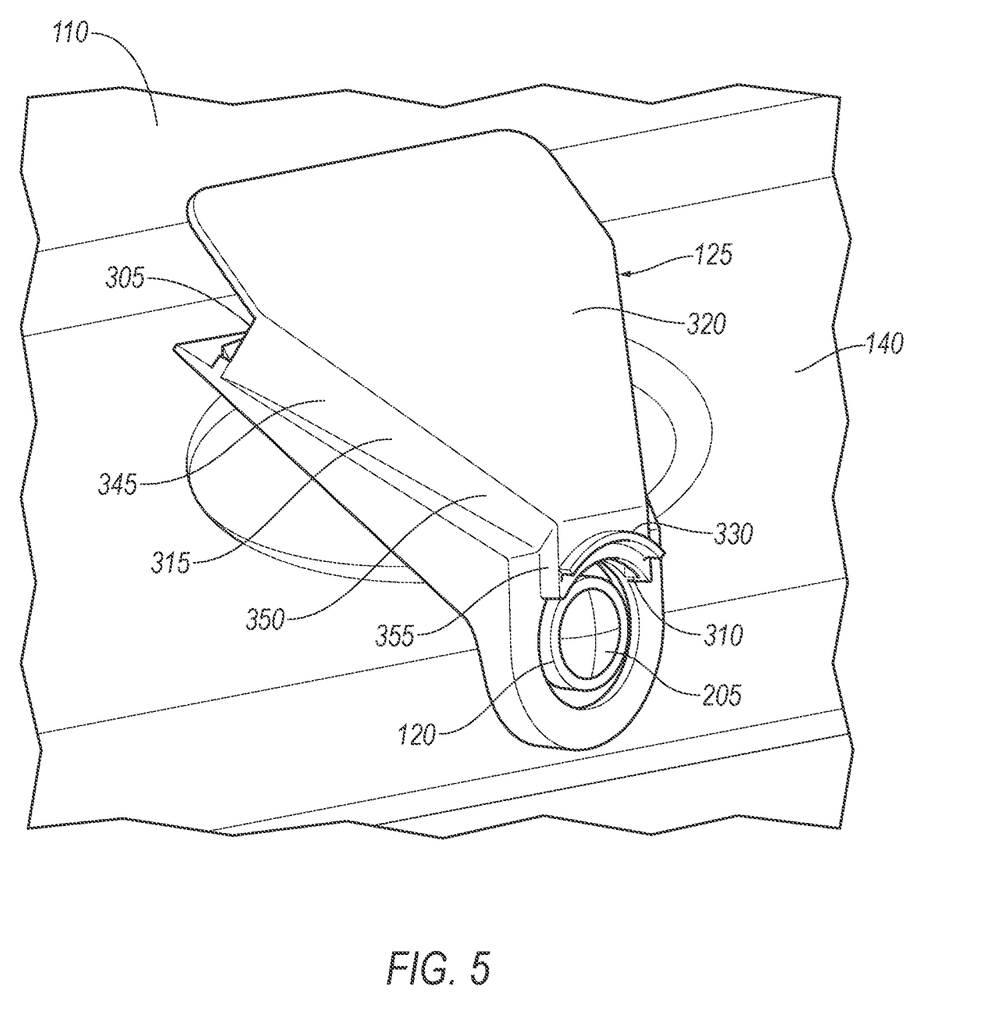
FIG. 5 is a rear perspective view of the deflector on the portion of the vehicle.

With reference to FIGS. 3-5, the deflector 125 is shaped to direct the fluid onto the sensor 120, e.g., the lens 205. For example, the deflector 125 may include an inlet 305 for receiving the fluid, an outlet 310 for directing the fluid onto the sensor 120, and a channel 315 leading from the inlet 305 to the outlet 310, which will each be described in more detail below. The deflector 125 may further include a cover 320 enclosing the channel 315, a first gutter 325 for diverting fluid flowing on the body panel 135 from entering the inlet 305, and a second gutter 330 for diverting fluid flowing over the cover 320 away from the sensor 120, which will each be described in more detail below. The deflector 125 may be integral, i.e., made of a single, uniform piece of material with no seams, joints, fasteners, or adhesives holding it together.

With reference to FIG. 3, the deflector 125 may include the inlet 305 positioned to receive the fluid from the sprayer 115. The inlet 305 is facing at least partially upwards so as to receive the fluid ejected by the sprayer 115 located above the deflector 125. The inlet 305 is positioned so that the stream 220 of fluid of the spray pattern 210 of the sprayer 115 enters through the inlet 305.

The deflector 125 may include the first gutter 325 positioned between the inlet 305 and the body panel 135. The first gutter 325 may be positioned to divert fluid flowing on the body panel 135, e.g., the liftgate 140, from entering the inlet 305. For example, the first gutter 325 may directly contact the body panel 135, e.g., the liftgate 140, and may be positioned above the inlet 305. The first gutter 325 may extend laterally across a full width of the inlet 305. The first gutter 325 may slope downward from a middle point of the inlet 305 to lateral edges of the width of the inlet 305. The shape and position of the first gutter 325 may prevent fluid runoff from the vehicle window 110 and/or the body panel 135 from entering the inlet 305. Fluid running off from the vehicle window 110 and the body panel 135 may be dirtier than the stream 220 of fluid directly from the sprayer 115.

The first gutter 325 may include a lip 335 along an edge of the first gutter 325 that is farther from body panel 135. The lip 335 may extend the full length of the first gutter 325, e.g., the full width of the inlet 305. The lip 335 may have a thickness extending away from the inlet 305, i.e., at least partially upward. The shape and position of the lip 335 can prevent fluid runoff from the vehicle window 110 and the body panel 135 from splashing over the first gutter 325.

With reference to FIG. 4, the deflector 125 may include the channel 315 leading from the inlet 305 to the outlet 310. The channel 315 may define a flow path for fluid from the inlet 305 to the outlet 310. For example, the channel 315 may include a U-shaped cross-section perpendicular to the direction of flow from the inlet 305 to the outlet 310. The channel 315 may include a floor 340 parallel to the body panel 135 and walls 345 extending away from the floor 340 in a direction away from the body panel 135 and positioned to constrain fluid flowing on the floor 340. The floor 340 and the walls 345 may be elongated from the inlet 305 to the outlet 310. The channel 315 may include a first segment 350 extending diagonally downward and rearward from the inlet 305 and a second segment 355 extending vertically downward from the first segment 350 to the outlet 310.

The deflector 125 may include the outlet 310 positioned to direct the fluid onto the sensor 120, e.g., the lens 205. The outlet 310 may be positioned directly above the lens 205 so that gravity directs fluid exiting the outlet 310 over the lens 205 of the sensor 120. A width of the outlet 310 in a lateral direction relative to the vehicle 100 may be equal to or less than a width of the lens 205, as shown in FIG. 5.

The deflector 125 may include the cover 320 enclosing the channel 315 from the inlet 305 to the outlet 310. For example, the cover 320 may extend from the inlet 305 to the outlet 310 and from one of the walls 345 of the channel 315 to the other of the walls 345 of the channel 315. The channel 315 and the cover 320 may form a tunnel from the inlet 305 to the outlet 310. The cover 320 may thus prevent rain from landing in the channel 315 and flowing to the sensor 120. Rain may be dirtier than the stream 220 of fluid directly from the sprayer 115. The cover 320 may have two flat portions, one extending over each of the first segment 350 and the second segment 355 of the channel 315.

With reference to FIG. 5, the cover 320 may be facing at least partially upward. The cover 320 may extend directly above an entirety of the inlet 305, i.e., a vertical line extending straight up from the inlet 305 will intersect the cover 320. For example, the cover 320 may extend from the inlet 305 in a direction that is partially upward and partially horizontally toward the body panel 135, thus covering the inlet 305 in a straight vertical direction while leaving the inlet 305 open in a diagonal direction to receive the stream 220 from the sprayer 115. The cover 320 may thus prevent rain from entering the channel 315 through the inlet 305 and flowing to the sensor 120. The cover 320 may include an interior side facing into the channel 315 and an exterior side facing away from the channel 315.

The deflector 125 may include the second gutter 330 positioned to divert fluid flowing on the exterior side of the cover 320 from flowing over the sensor 120. The second gutter 330 may be positioned on the cover 320, e.g., at a lower edge of the cover 320, e.g., on the portion of the cover 320 covering the second segment 355 of the channel 315. The second gutter 330 may have a thickness extending from the cover 320 in a direction away from the body panel 135. The second gutter 330 may extend laterally across a full width of the lens 205 or the outlet 310. The second gutter 330 may slope downward from a middle point of the second gutter 330, e.g., from a center of the lens 205 or outlet 310, to lateral edges of the width of the lens 205 or outlet 310. The shape and position of the second gutter 330 may prevent fluid runoff from the exterior side of the cover 320 from flowing onto the lens 205. Fluid running off from the cover 320 may be dirtier than the stream 220 of fluid directly from the sprayer 115.

The channel 315 may have a width oriented parallel to the vehicle window 110 and perpendicular to a direction of flow through the channel 315, and the width of the channel 315 may be smaller at the outlet 310 than at the inlet 305. The width of the channel 315 may decrease continuously from an end of the channel 315 closer to the inlet 305 to an end of the channel 315 closer to the outlet 310. For example, the width of the channel 315 may decrease continuously along the first segment 350 from the inlet 305 to the second segment 355. A cross-sectional area of the tunnel formed by the channel 315 and the cover 320 may be smaller at the outlet 310 than at the inlet 305. The cross-sectional area of the tunnel may decrease continuously from an end of the tunnel closer to the inlet 305 to an end of the tunnel closer to the outlet 310. For example, the cross-sectional area of the tunnel may decrease along the first segment 350 from the inlet 305 to the second segment 355. The decreasing width and/or cross-sectional area may increase a flowrate of the fluid flowing onto the sensor 120, which may enhance the cleaning provided by the deflector 125.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A vehicle assembly comprising:
 a vehicle window;
 a sprayer positioned above the vehicle window and aimed at the vehicle window;
 a sensor positioned below the vehicle window; and
 a deflector positioned to receive fluid from the sprayer and shaped to direct the fluid to the sensor.

2. The vehicle assembly of claim 1, further comprising a body panel, wherein the vehicle window is mounted to the body panel, the sensor is mounted to the body panel, and the deflector is mounted to the body panel.

3. The vehicle assembly of claim 2, wherein the sprayer is mounted to the body panel.

4. The vehicle assembly of claim 2, wherein the body panel is a liftgate, and the vehicle window is a rear windshield.

5. The vehicle assembly of claim 2, wherein the deflector includes an inlet positioned to receive the fluid from the sprayer and a gutter positioned between the inlet and the body panel.

6. The vehicle assembly of claim 5, wherein the gutter is positioned to divert fluid flowing on the body panel from entering the inlet.

7. The vehicle assembly of claim 1, wherein the deflector is positioned to receive the fluid passing through ambient air from the sprayer to the deflector.

8. The vehicle assembly of claim 1, wherein the deflector includes an inlet positioned to receive the fluid from the sprayer, an outlet positioned to direct the fluid onto the sensor, and a channel leading from the inlet to the outlet.

9. The vehicle assembly of claim 8, wherein the channel has a width oriented parallel to the vehicle window and perpendicular to a direction of flow through the channel, and the width of the channel is smaller at the outlet than at the inlet.

10. The vehicle assembly of claim 9, wherein the width of the channel decreases continuously from an end of the channel closer to the inlet to an end of the channel closer to the outlet.

11. The vehicle assembly of claim 8, wherein the deflector includes a cover enclosing the channel from the inlet to the outlet.

12. The vehicle assembly of claim 11, wherein the channel and the cover form a tunnel, and a cross-sectional area of the tunnel is smaller at the outlet than at the inlet.

13. The vehicle assembly of claim 12, wherein the cross-sectional area of the tunnel decreases continuously from an end of the tunnel closer to the inlet to an end of the tunnel closer to the outlet.

14. The vehicle assembly of claim 11, wherein the cover is facing at least partially upward.

15. The vehicle assembly of claim 14, wherein the inlet is facing at least partially upwards, and the cover extends directly above an entirety of the inlet.

16. The vehicle assembly of claim 11, wherein the cover includes an exterior side facing away from the channel, and the deflector includes a gutter positioned to divert fluid flowing on the exterior side of the cover from flowing over the sensor.

17. The vehicle assembly of claim 1, wherein the sprayer is shaped to eject the fluid in a spray pattern, and the spray pattern includes a flat-fan pattern directed onto the vehicle window.

18. The vehicle assembly of claim 17, wherein the spray pattern includes a stream directed past the vehicle window to the deflector.

19. The vehicle assembly of claim 1, wherein the deflector is positioned vertically between the vehicle window and the sensor.

20. The vehicle assembly of claim 1, wherein the sensor is a camera including a lens, and the deflector is shaped to direct the fluid onto the lens.

* * * * *